(12) United States Patent
Dave et al.

(10) Patent No.: US 9,749,373 B2
(45) Date of Patent: Aug. 29, 2017

(54) SYSTEM AND METHOD FOR IMPROVED CONTENT STREAMING

(75) Inventors: Swapnil R. Dave, Santa Clara, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 574 days.

(21) Appl. No.: 13/585,349

(22) Filed: Aug. 14, 2012

(65) Prior Publication Data

US 2014/0052872 A1  Feb. 20, 2014

(51) Int. Cl.
*H04L 29/06* (2006.01)

(52) U.S. Cl.
CPC ...... *H04L 65/4084* (2013.01); *H04L 65/1083* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 6,377,996 B1 * | 4/2002 | Lumelsky | H04L 29/06 709/203 |
| 7,096,271 B1 * | 8/2006 | Omoigui | H04L 29/06027 709/217 |
| 7,299,291 B1 * | 11/2007 | Shaw | 709/231 |
| 7,552,218 B2 * | 6/2009 | Kaluskar et al. | 709/227 |
| 7,683,940 B2 * | 3/2010 | Fleming | 348/222.1 |
| 7,724,753 B2 * | 5/2010 | Naqvi | H04M 7/123 370/410 |
| 7,886,069 B2 * | 2/2011 | Osborne | 709/231 |

(Continued)

OTHER PUBLICATIONS

Begen, Ali C., Tankut Akgul, and Mark Baugher. "Watching video over the web: Part 1: Streaming protocols." Internet Computing, IEEE 15.2 (2011): 54-63.*

(Continued)

*Primary Examiner* — Scott B Christensen
*Assistant Examiner* — Lam Do
(74) *Attorney, Agent, or Firm* — Sterne, Kessler, Goldstein & Fox P.L.L.C.

(57) ABSTRACT

A system and methods for improved streaming of content. After streaming of a content item from a wireless device (e.g., a smart phone, a table computer) commences to a presentation device (e.g., a media receiver, a television), the presentation device determines that it can stream the content item from an alternative source, such as a web server, data server or other content repository residing on the Internet or other network. The presentation device initiates the alternative streaming and notifies the wireless device that it may stop streaming. The wireless device may continue to provide control inputs to allow a user to pause, play, fast forward or otherwise control the presentation, and may or may not present the content item locally. If the presentation device must cease streaming of the content item from the alternative source, it notifies the wireless device, which resumes streaming.

20 Claims, 3 Drawing Sheets

(56) References Cited

U.S. PATENT DOCUMENTS

| | | | |
|---|---|---|---|
| 8,099,476 B2* | 1/2012 | Biderman et al. | 709/219 |
| 8,117,328 B2* | 2/2012 | Choi | H04L 29/06 709/219 |
| 8,181,226 B2* | 5/2012 | Lohr | H04L 67/14 455/412.2 |
| 8,407,747 B1* | 3/2013 | Inskip et al. | 725/90 |
| 8,589,583 B2* | 11/2013 | Gutarin et al. | 709/233 |
| 2002/0082015 A1* | 6/2002 | Wu | H04L 29/06 455/436 |
| 2003/0055995 A1* | 3/2003 | Ala-Honkola | 709/231 |
| 2003/0229900 A1* | 12/2003 | Reisman | 725/87 |
| 2004/0010593 A1* | 1/2004 | Apostolopoulos | H04L 67/1008 709/226 |
| 2004/0068572 A1* | 4/2004 | Wu | H04L 67/14 709/229 |
| 2007/0157267 A1* | 7/2007 | Lopez-Estrada | 725/90 |
| 2008/0186198 A1* | 8/2008 | Pirzada | G07C 9/00111 340/686.6 |
| 2008/0320500 A1* | 12/2008 | Li | G06F 3/038 719/324 |
| 2009/0063690 A1* | 3/2009 | Verthein et al. | 709/228 |
| 2009/0158326 A1* | 6/2009 | Hunt et al. | 725/38 |
| 2010/0153576 A1* | 6/2010 | Wohlert | H04N 21/43615 709/231 |
| 2010/0161813 A1* | 6/2010 | Avasarala | H04L 65/1069 709/228 |
| 2010/0169303 A1* | 7/2010 | Biderman | H04N 7/17318 707/723 |
| 2010/0198979 A1* | 8/2010 | Pickens et al. | 709/231 |
| 2011/0179186 A1* | 7/2011 | Li et al. | 709/231 |
| 2011/0219105 A1* | 9/2011 | Kryze et al. | 709/223 |
| 2012/0059946 A1* | 3/2012 | Wang | 709/231 |
| 2012/0226817 A1* | 9/2012 | Woxblom | H04L 12/2809 709/231 |
| 2012/0233345 A1* | 9/2012 | Hannuksela | 709/231 |
| 2012/0265892 A1* | 10/2012 | Ma et al. | 709/231 |
| 2012/0299811 A1* | 11/2012 | Amendolagine | G09G 5/00 345/156 |
| 2013/0067107 A1* | 3/2013 | Klemets | H04N 21/632 709/231 |
| 2013/0227053 A1* | 8/2013 | Bouazizi | 709/217 |
| 2013/0251329 A1* | 9/2013 | McCoy | H04N 21/654 386/201 |

OTHER PUBLICATIONS

Stockhammer, Thomas. "Dynamic adaptive streaming over HTTP--: standards and design principles." Proceedings of the second annual ACM conference on Multimedia systems. ACM, 2011.*

Mukhtar, Hamid, Djamel Belaid, and Guy Bernard. "Session mobility of multimedia applications in home networks using upnp." Multitopic Conference, 2007. INMIC 2007. IEEE International. IEEE, 2007.*

Shacham, R., et al. Rfc 5631: Session initiation protocol (sip) session mobility. vol. 9. Technical report, IETF, 2009.*

Cui, Yi, Klara Nahrstedt, and Dongyan Xu. "Seamless user-level handoff in ubiquitous multimedia service delivery." Multimedia Tools and Applications 22.2 (2004): 137-170.*

Stähle, Thomas, et al. "Real-Time Multimedia Session Splitting and Seamless Mobility in Session Initiation Protocol Environments."*

Bouthillier, Larry, "How to do Dynamic Streaming with Flash Media Server," http://www.streamingmedia.com/Articles/Editorial/Featured-Articles/How-to-do-Dynamic-Streaming-with-Flash-Media-Server---66199.aspx, Mar. 25, 2010.*

Wowza, "How to switch streams using Stream class streams," https://www.wowza.com/forums/content.php?266-How-to-switch-streams-using-Stream-class-streams, Jun. 27, 2011.*

Li, Zhenhua; Cao, Jiannong; Chen, Guihai; and Liu, Yan, "On the source switching problem of Peer-to-Peer Streaming," http://net.pku.edu.cn/~Izh/papers/JPDC'10.pdf, Feb. 2, 2010.*

Zhang, Hongchi; Al-Nuaimi, Anas; Gu, Xiaoyu; Fahrmair, Michael; Ishibashi, Ryota; "Seamless and Efficient Stream Switching of Multi-Perspective Videos;" http://ieeexplore.ieee.org/document/6229741/, May 10, 2012.*

Mossberg, Walt, "Apple TV: Streaming and Renting From Devices;" http://allthingsd.com/20101201/apple-tv-2010-review/, Dec. 1, 2010.*

Qualcomm, "Stream Content from Your Phone to TV—for Free;" https://www.qualcomm.com/news/onq/2011/11/03/stream-content-your-phone-tv-free, Nov. 3, 2011.*

Apple, "Best Practices for Creating and Deploying HTTP Live Streaming Media for Apple Devices;" https://developer.apple.com/library/ios/technotes/tn2224/_index.html#//, Mar. 19, 2010.*

* cited by examiner

SYSTEM AND METHOD FOR IMPROVED CONTENT STREAMING

BACKGROUND

This invention relates to the field of data communications. More particularly, a system and methods are provided for improving the streaming of content from a wireless device.

Wireless devices such as smart phones and tablet computers are often used to view movies, photographs and other content. However, such devices typically have small display screens, poor sound quality and/or other limitations. Schemes have been developed to allow a user to stream content from a wireless device to a more robust device, such as a television or a desktop computer that has a larger display screen, better speakers and/or other benefits.

However, these schemes can suffer from drawbacks that may detract from a user's enjoyment of the streamed media. For example, the content must not only be delivered to the wireless device (e.g., through a telephone service provider's network and a transmitter), but then must be re-transmitted from the wireless device to the destination device or some intermediary (e.g., a wireless access point).

While wireless communication technologies continue to improve, there are latency issues, range limitations, vulnerabilities to interference, limits on transmission rates, bandwidth limitations, etc. And, while the wireless device is streaming content to another device, it may be unable to handle a telephone call, a peripheral component or some other normal operation, or such operation may be deteriorated in quality or it may interrupt the streaming.

SUMMARY

In some embodiments of the invention, a system and methods are provided for improving the streaming of content between a mobile/wireless device and a more robust presentation device such as a television, a media receiver or other device.

In these embodiments, the wireless device begins streaming the content via a wireless communication connection toward the presentation device. Illustratively, the wireless device may communicate wirelessly with an access point or other network device, which is coupled to the presentation device via wire, optical fiber or some other link.

The presentation device accepts the streaming and determines whether it can stream the same content from an alternative source, possibly one that can stream it faster, with less degradation, over a more reliable connection, etc. If so, it starts streaming from an alternative source (e.g., a web server, a media provider, a content repository), and may stream a different version (e.g., high definition, three-dimensional).

The wireless device may provide information to the presentation device to help it shift the streaming or to help determine if it can shift the streaming, such as an identity of the content (e.g., movie title) or a provider of the content (e.g., a network address of a content repository), a timestamp at which it is currently streaming, etc.

In embodiments of the invention, even after streaming of the content shifts away from the wireless device, the wireless device continues to receive control inputs from a user (e.g., play, pause, rewind) and forwards those control commands to the presentation device for execution. The streaming is thus bifurcated, with content passing to the presentation device from one source, and control from another.

If the alternative streaming terminates, or if the presentation device must terminate the alternative streaming, it notifies the wireless device and may identify a current location within the content. The wireless device then resumes streaming of the content to the presentation device.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, a system and method are provided for improved streaming of content to a presentation device (e.g., a television, a projector, a computer monitor, a media receiver or console), wherein the streaming commences from a wireless device such as a smart phone, a tablet computer or other entity.

In specific implementations discussed below, the wireless device is a device executing the iOS operating system by Apple® (e.g., an iPhone®, an iPad®, an iPod®), and the presentation device is an Apple TV® appliance coupled to a television. The two devices are therefore capable of operating a common application or utility that supports content streaming and the presentation of content.

From the following discussion, one of ordinary skill in the art will be able to readily develop other implementations that do not exceed the scope of the invention described herein. For example, many televisions and other media appliances are capable of executing applications supplied by content providers (e.g., NetFlix, YouTube) for presenting their content.

In some embodiments, the content streaming is improved by bifurcating it. In these embodiments, control of the presentation remains with the wireless device (e.g., to pause, play, rewind), which transmits commands to the presentation device, while the content is delivered via a different path.

In particular, streaming of the desired content (e.g., a movie) may commence to the presentation device from the wireless device, but the presentation device or some intermediary entity (e.g., a media gateway or receiver) recognizes that streaming has commenced, may identify the application that is performing the streaming, may determine what is being streamed and/or consider other information. If it is capable of receiving/streaming the content through a path that does not include the wireless device, it will do so and advise the wireless device. A user may continue to control the presentation by manipulating the wireless device to pause, rewind, play and so on, but the content no longer needs to be streamed from the wireless device to the presentation device.

Some content streaming or sharing tools operate in an all-or-none manner, meaning that all the content and control of the presentation is through the wireless device only. Embodiments of the invention provided herein can provide a better presentation and more efficient use of both devices, and alleviate issues associated with the wireless device such as power consumption, bandwidth limitations, range restrictions, etc. And, because the content is no longer limited to a form that can streamed from the wireless device, a better or different version of the content may be streamed.

Figure 1:
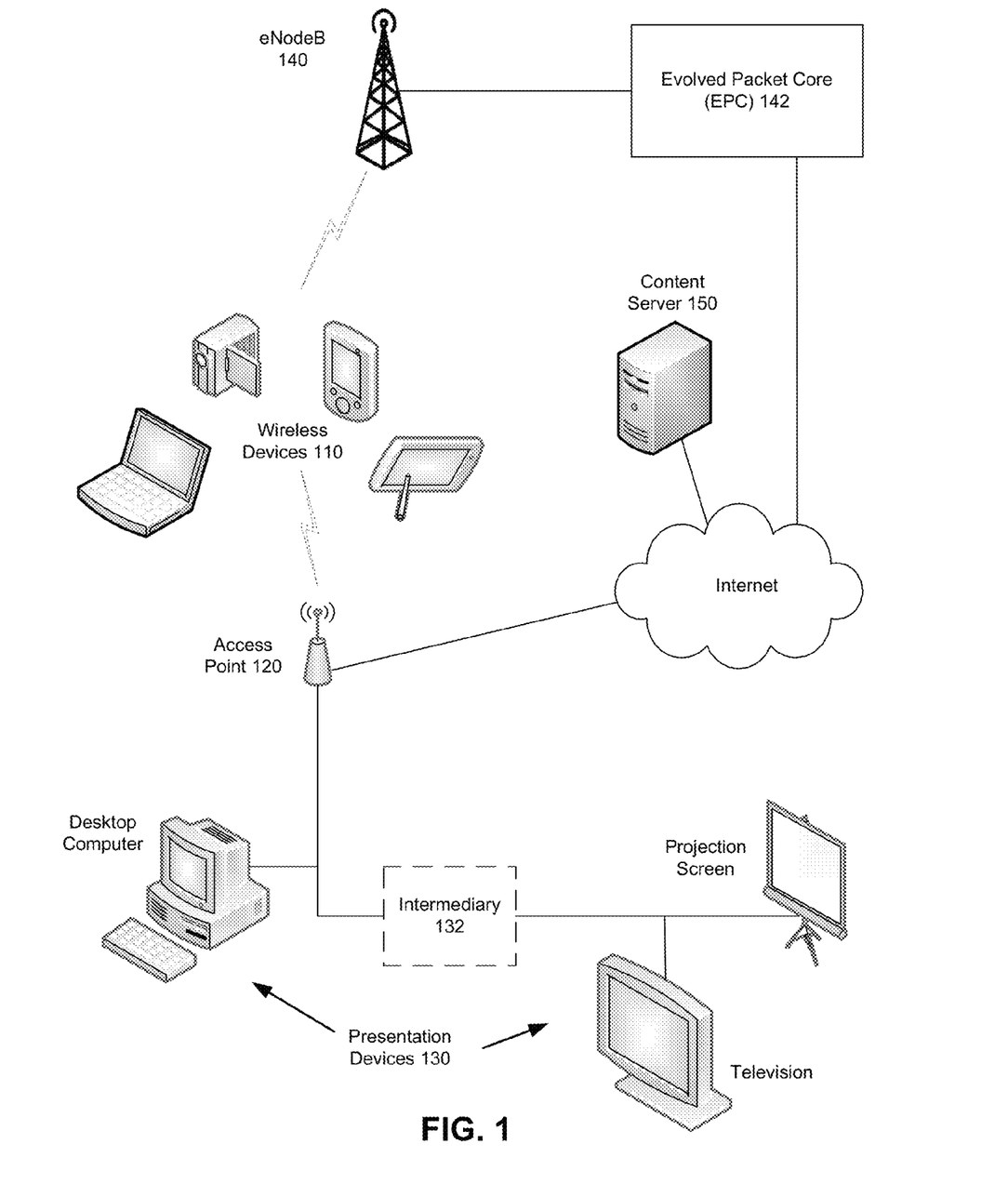
FIG. 1 is a diagram of an environment in which some embodiments of the invention may be implemented.

FIG. 1 is a diagram of an environment in which some embodiments of the invention may be implemented.

In these embodiments, a user operates a wireless device 110, which may be a smart phone, a tablet computer, a camera, a laptop computer or some other device capable of wireless data communication. Wireless device 110 stores media, such as movies, photographs, music, a game, etc., or is able to retrieve such media from a repository such as content server 150. The user also has access to a presentation device 130 that is able to present the user's selected content in a more attractive or enjoyable manner.

Program logic or other processor-executable instructions for improving content streaming as described herein may reside in the operating system of a wireless device and/or presentation device, or as part of an application or utility executing on such a device. The logic may take the form of firmware or software, and may be installed or updated before streaming is requested, or may be done as part of the process.

For example, a content provider (e.g., NetFlix, YouTube, Hulu) may provide compatible applications for execution on a user's wireless device 110 and a presentation device 130. A content provider may also operate content server 150 and/or other repositories that can stream content to presentation device 130.

Access point 120 is capable of data connections with both wireless device 110 and presentation device 130, and may provide either or both of them with access to the Internet and/or other networks (e.g., a home network, an office network), as well as content repositories that include content server 150. A presentation device 132, such as a television, stereo, computer, projector and so on, may be coupled to access point 120 by an intermediary, which may be a media receiver such as Apple TV or some other platform capable of executing a media sharing protocol or application (e.g., AirPlay® or AirPlay Mirroring®) or capable of supporting presentation of content.

Therefore, as used herein, the term "presentation device" may refer to the device on which an image is displayed (e.g., a television, a monitor, a projection screen), a device that reproduces a sound (e.g., a speaker) and/or an entity that facilitates such display or reproduction (e.g., an Apple TV receiver, a projector, a computer).

In FIG. 1, the access point employs a wireless connection to communicate with device 110, and a wired connection to communicate with device 130. In other embodiments, however, the types of connections between access point 120 and the wireless and presentation devices may be different.

Wireless device 110 also communicates with eNodeB 140, which may be a NodeB or some other type of wireless transceiver or cellular transmission tower in other embodiments. eNodeB 140 is connected to a telephone service provider's network 142, such as a Long-Term Evolution (LTE) Evolved Packet Core (EPC) that, in turn, is coupled to content server 150 and/or other content repositories.

Because control of media streamed to presentation device 130 may remain with the user's wireless device, a user may be unaware that content streaming to the presentation device has shifted to a path that does not include wireless device 110. In some implementations, however, control of the presentation may also move (or be shared with) a remote control associated with the presentation device or with some other controller.

After content streaming shifts away from wireless device 110, the quality of the presentation will no longer be limited by its form of the media and/or limitations of its wireless link with access point 120. Instead, presentation device 130 may receive a better (e.g., higher resolution) version of the content, a different form (e.g., three-dimensional), may be able to buffer more of the content and avoid undesired pauses in the presentation, etc.

A wireless device referred to herein may or may not be capable of wired communications in addition to wireless communications. Therefore, an embodiment of the invention may be implemented in an environment in which a user's wireless device can have a wired coupling to a presentation device in addition to or instead of a wireless coupling.

Figure 2:
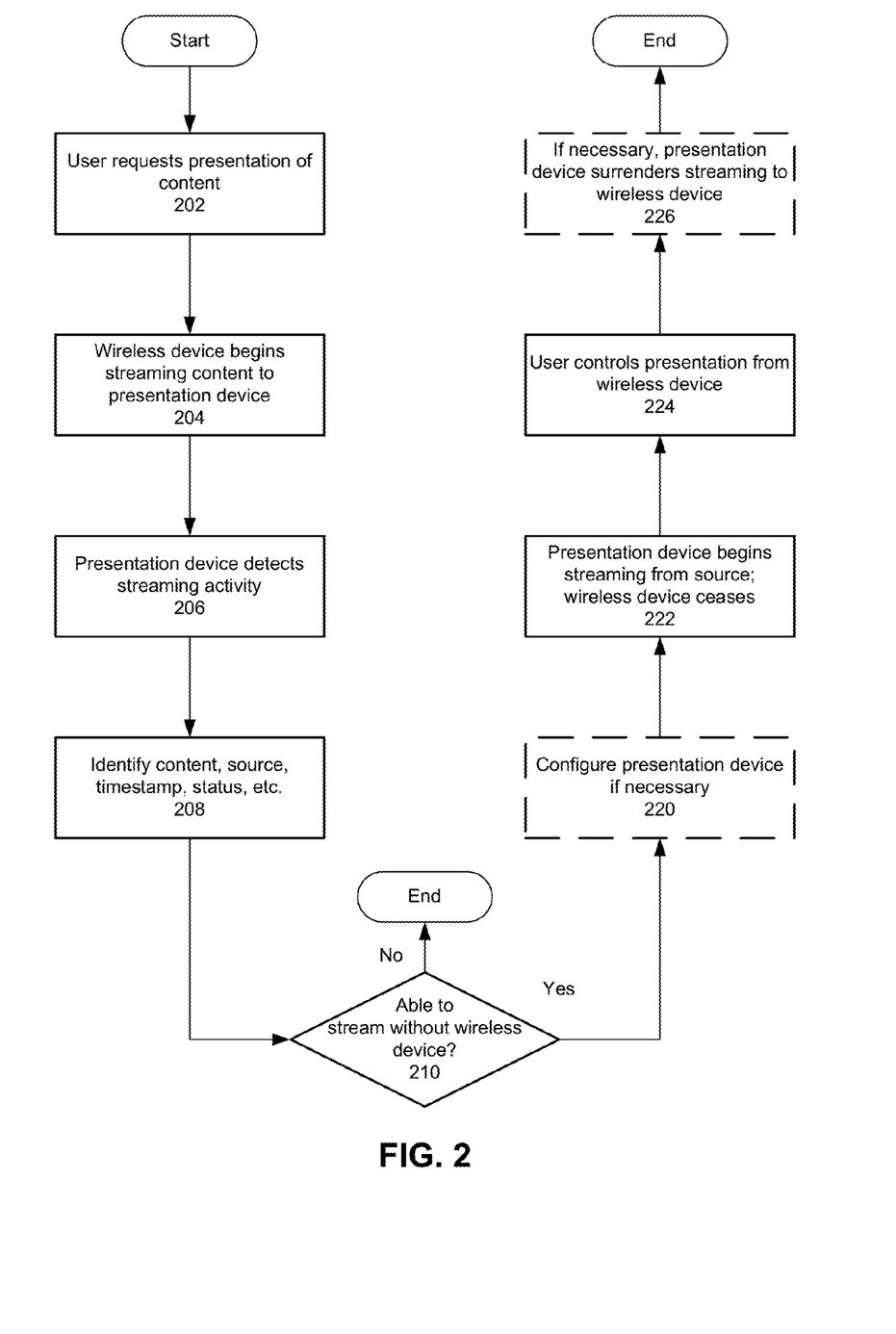
FIG. 2 is a flow diagram demonstrating a method of transferring the streaming of content, according to some embodiments of the invention.

FIG. 2 is a flow diagram demonstrating a method of transferring the streaming of content, according to some embodiments of the invention. As already discussed, control of the presentation of the content may remain with the device that originated the streaming.

In operation 202, a user of a wireless device requests the presentation of content on a presentation device (i.e., content that is available on or through the wireless device). As mentioned previously, this operation may be facilitated by a utility within an operating system of the wireless device and/or by an application installed on the device. For example, a content provider may supply the user with an app that allows content offered by the content provider to be played on the wireless device and/or streamed to another device.

In operation 204, the wireless device commences streaming content to the presentation device. The content may reside on the wireless device or may be streamed to the wireless device from another repository, and then to the presentation device. As described above, the content may be communicated wirelessly from the wireless device, through an access point or similar entity (e.g., switch, router, gateway), and possibly to a computer system, media receiver or other intermediary that facilitates presentation of content on a television or other device.

In some embodiments of the invention, the content may be played or presented on the wireless device, completely or partially (e.g., video and audio, only video), while it is played on the presentation device. In other embodiments, presentation of the content may be only on the presentation device.

In operation 206, the presentation device begins receiving the content. At some point, the device recognizes that it is streaming content that it may be able to obtain elsewhere, perhaps based on the application or utility that executes on the presentation device for presenting the content, perhaps based on the communication connection or port through which it receives the content, perhaps from information that is received from the wireless device, etc.

In some embodiments of the invention, the presentation device may take further action before it even begins presenting the content (e.g., to receive the content via a path other than from the wireless device). Alternatively, the device may begin presenting the content, and only take further action after presentation has started.

In yet other embodiments, the wireless device may notify the presentation device that it is going to stream content to it, before it actually commences sending the content. In these embodiments, the presentation device may take further action before it starts receiving the content from the wireless device, assuming that it receives necessary information (e.g., identity of content, address or location of a source repository from which the content may be retrieved).

In operation 208, the presentation device receives information regarding the content, from the wireless device, by extracting it from the content stream or a request to present the content, or in some other way. The information may include, but is not limited to, an identity of the content (e.g., movie name, song title), a source of the content (e.g., an IP address of a content repository), a timestamp or other indication of the current position in the content, a status of the presentation (e.g., playing, paused), etc.

In operation 210, the presentation device determines whether it can or may be able to obtain or stream the content from a source other than the wireless device. This determination may be based on information gathered in operation 208 or earlier.

For example, if the content is to be played with an application provided by or associated with a particular content repository, and the presentation device has a connection open to that repository or is able to open one (e.g., the device has a connection to the Internet), then it may assume that it can retrieve the content directly from that repository. The presentation device may attempt to initiate a connection to the identified content source or repository to determine whether the content can be obtained there.

If the presentation device can stream or receive the content without the wireless device, the illustrated method may continue at operation 220. Otherwise, streaming will have to continue from the wireless device and the method ends.

In optional operation 220, the presentation device may require additional configuration in order to allow it to play the content without the wireless device. For example, a program for presenting the content or for obtaining it from a source may need to be installed or updated on the presentation device before it can stream the content separately from the wireless device. In this case, operation 220 may involve installing the program.

In some other embodiments, a credential (e.g., digital certificate, decryption key, username and password) may need to be copied or transferred from the wireless device. An application for presenting the content may already reside on both the wireless device and the presentation device, but the credential may be needed in order to open a session with the content source. For example, the user may be at a friend's house, and the user's credential may have to be (temporarily) loaned to the presentation device in order to allow streaming of the content from a source other than the wireless device (or even from the wireless device itself).

In operation 222, the presentation device begins streaming the content from an alternative source and presenting it. The device therefore notifies the wireless device that it can halt its streaming. As mentioned previously, the wireless device may or may not continue playing the content locally (e.g., on that device's display screen).

In some embodiments of the invention, a message or other notification may be displayed on the wireless device to indicate that streaming of the content is now proceeding from another source. The alternative source, and/or other details of the alternative streaming, may or may not be identified.

In operation 224, the user continues to control the presentation via the wireless device, even though the wireless device is no longer providing the content to the presentation device. The wireless device may remain synchronized with the presentation, by continuing to play the content locally, by simulating playing the content (e.g., tracking time), by receiving updates from the presentation device, or in some other manner.

In some alternative embodiments, control of the presentation may be shared with or transferred to another entity, such as a remote control for the presentation device.

In optional operation 226, the presentation device may find that it cannot continue streaming the content independent of the wireless device. Illustratively, it may lose its connection to the alternative content source, a session with the source may expire, etc.

In this case, the presentation device advises the wireless device that its alternative streaming is terminating, re-synchronizes the device if necessary by identifying the current timestamp or time offset into the content (or in some other manner), and the wireless device resumes streaming the content to the presentation device. After operation 226, the illustrated method ends.

Figure 3:
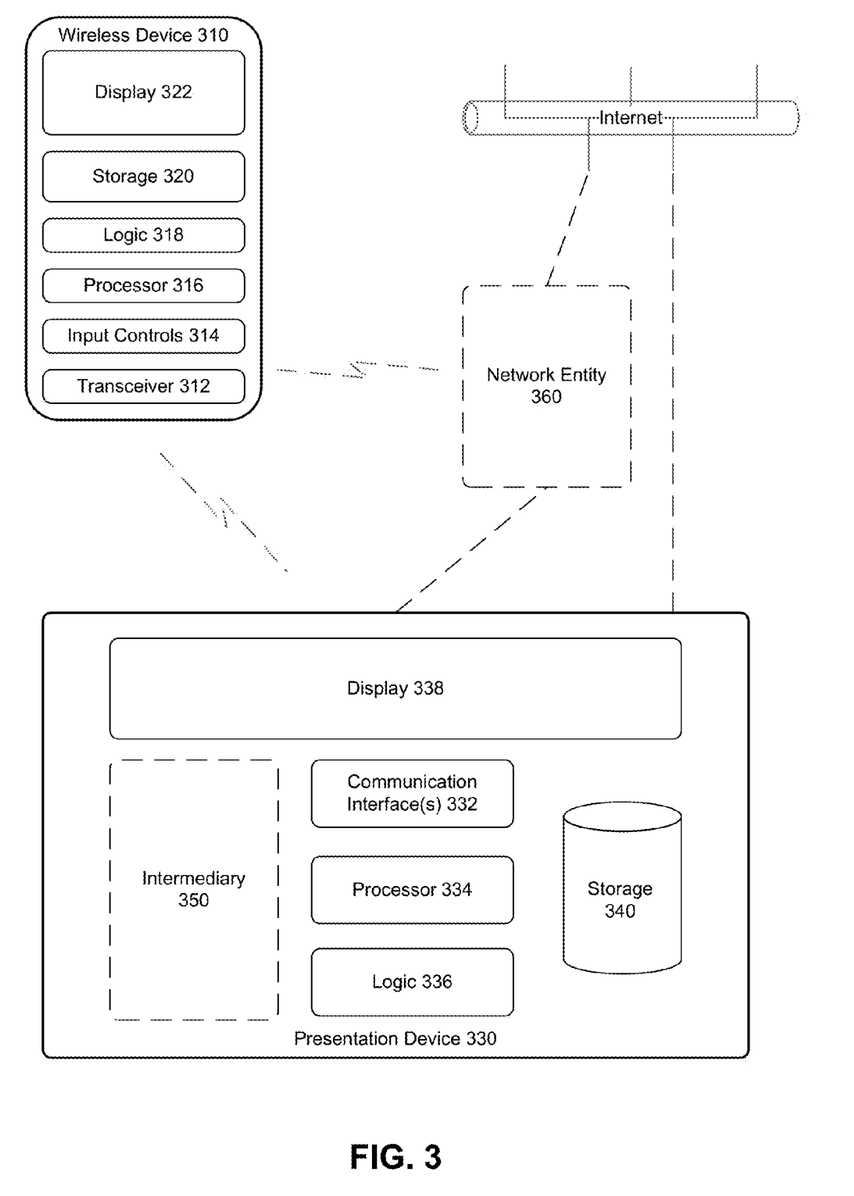
FIG. 3 is a block diagram of a system in which some embodiments of the invention may be implemented.

FIG. 3 is a block diagram of a system in which some embodiments of the invention may be implemented.

Wireless device 310 of FIG. 3 comprises transceiver 312 (e.g., a baseband processor), input controls 314, processor 316, logic 318, storage 320 and display 322. Transceiver 312 enables wireless voice and data connections to a telephone service provider and/or other entities—such as network entity 360 (e.g., an access point) or directly to presentation device 330. Input controls 314 relay input from a user to operate device 310, make a telephone call, control presentation of content, and so on.

Processor 316 of wireless device 310 executes logic 318 and/or other program code for conducting voice and/or data connections, running applications, accessing and presenting content, processing control inputs from users, providing GPS (Global Positioning System) services, playing games and so on. Processor 316 may be a microprocessor or an application processor in some implementations. Storage 320 may be solid-state, magnetic or optical in nature and, in addition to program code, stores data that may include media content.

Logic 318 may be configured as firmware or, alternatively, may be stored as software within storage 320. Logic 318 may include processor-executable code or instructions for streaming content from wireless device 310 and toward presentation device 330, for signaling to the presentation device inputs by a user to control the presentation (e.g., to pause, play, rewind, increase volume, adjust audio tone), for receiving and applying an instruction or signal (from presentation device 330) to terminate (or restart) streaming of content and/or control inputs, and/or for other functions.

Presentation device 330 comprises communication interface(s) 332, processor 334, logic 336, display 338 and storage 340. In the illustrated embodiment, device 330 may include intermediary 350, which may function as a receiver, console or gateway for processing and assisting in the presentation of content. In other embodiments, intermediary 350 is distinct from presentation device 330 or is omitted altogether.

Communication interface(s) 332 enable wired and/or wireless communication connections with a data network, network entity 360, wireless device 310 and/or other entities. Processor 334 executes logic 336 and/or other program code to manage data connections, execute applications, access and present content, determine whether content can be streamed from somewhere other than device 310, etc. Logic 336 may be firmware or, alternatively, may be stored within storage 340, which may be solid-state, magnetic or optical and which may store content temporarily or permanently.

Logic 336 may include processor-executable code or instructions for receiving streamed content from a first source, presenting the content, receiving and applying control input for controlling the presentation of the content, identifying or selecting an alternative source of the content, signaling the first source to terminate the streaming of content, commencing streaming the content from an alternative source, notifying the first source to resume streaming, and/or for other functions.

In different embodiments of the invention, some of the components of presentation device 330 may reside or be duplicated within intermediary 350. Thus, when content is streamed to presentation device 330 as described above, intermediary 350 may or may not be involved in processing the content stream, receiving and applying controls, and presenting the content on display 338.

Optional network entity 360 comprises communication interfaces for communicating with wireless device 310, presentation device 330 and possibly external networks or data links (e.g., to the Internet, to a satellite service provider).

The environment in which some embodiments of the invention are executed may incorporate a general-purpose computer or a special-purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of streaming content, the method comprising:
   initiating, at a first device, streaming of a content item to a presentation device via a wireless communication connection;
   receiving, at the first device, from the presentation device a notification that the presentation device is to stream the content item from an alternative source;
   based at least in part on receiving the notification, terminating, at the first device, streaming of the content item to the presentation device from the first device; and
   after terminating streaming of the content item to the presentation device from the first device, maintaining control of a presentation of the content item during streaming of the content item from the alternative source, the maintaining control comprising:
   receiving, at the first device, a control input for controlling the presentation of the content item; and
   transmitting, by the first device, the control input to the presentation device, wherein the control input controls the presentation of the content item on the presentation device as the presentation device streams the content item from the alternative source.

2. The method of claim 1, further comprising:
   transmitting to the presentation device one or more of:
   an identity of the content item;
   identities of at least one source of the content item, including the alternative source; and
   a current timestamp of the streaming within the content item.

3. The method of claim 1, further comprising:
   displaying, on a display component of the first device, an indication that streaming of the content item from the first device has been terminated.

4. The method of claim 1, further comprising:
   receiving a notification that streaming of the content item to the presentation device from the alternative source is terminating; and
   resuming streaming of the content item to the presentation device from the first device.

5. The method of claim 4, further comprising:
   receiving from the presentation device a current timestamp of the content item at which to resume streaming of the content item to the presentation device from the first device.

6. The method of claim 1, further comprising:
   controlling, by the first device, the presentation of the content item on the presentation device while streaming the content item from the first device to the presentation device.

7. A non-transitory processor-readable medium storing instructions that, when executed by a processor, cause the processor to perform a method of streaming content, the method comprising:
   initiating, at a first device, streaming of a content item to a presentation device via a wireless communication connection;
   receiving, at the first device, from the presentation device a notification that the presentation device is to stream the content item from an alternative source;
   based at least in part on receiving the notification, terminating, at the first device, streaming of the content item to the presentation device from the first device; and after terminating streaming of the content item to the presentation device from the first device, maintaining control of a presentation of the content item during streaming of the content item from the alternative source, the maintaining control comprising:
receiving, at the first device, a control input for controlling the presentation of the content item; and
transmitting, by the first device, the control input to the presentation device, wherein the control input controls the presentation of the content item on the presentation device as the presentation device streams the content item from the alternative source.

8. A device for streaming content, comprising:
a processor; and
a wireless communication interface;
wherein the processor and the wireless communication interface are configured to:
initiate streaming of a content item to a presentation device via a wireless communication connection;
receive from the presentation device a notification that the presentation device is to stream the content item from an alternative source;
based at least in part on the notification, terminate the streaming of the content item to the presentation device from the first device; and
after termination of the streaming of the content item to the presentation device from the first device, maintain control of a presentation of the content item during streaming of the content item from the alternative source, wherein to maintain control of the presentation, the processor and the wireless communication interface are configured to:
receive a control input to control the presentation of the content item; and
transmit the control input to the presentation device, wherein the control input controls the presentation of the content item on the presentation device as the presentation device streams the content item from the alternative source.

9. A method of streaming content from a presentation device, the method:
streaming a content item from a first source;
presenting the content item during the streaming;
identifying a second source of the content item;
initiating streaming of the content item from the second source;
transmitting, to the first source, a notification indicating that the presentation device is to stream the content item from the second source;
after transmitting the notification, terminating streaming of the content item from the first source; and
after terminating streaming of the content item from the first source, maintaining control of a presentation of the content item during streaming of the content item from the alternative source, the maintaining control comprising:
receiving, from the first source, a control input for controlling the presentation of the content item as the presentation device streams the content item from the second source; and
using the control input to control the presentation of the content item.

10. The method of claim 9, wherein:
the first source comprises a wireless device; and
the second source comprises a content repository other than the wireless device.

11. The method of claim 9, further comprising:
receiving from the first source one or more of:
an identity of the content item;
a location of the second source of the content item; and
a current timestamp within the content item.

12. The method of claim 9, wherein identifying the second source of the content item comprises:
identifying an alternative source of the content item;
determining whether a connection to the alternative source of the content item can be used to receive the content item;
establishing a connection to the alternative source of the content item based on the determining; and
identifying the alternative source of the content item as the second source of the content item.

13. The method of claim 9, further comprising:
determining that streaming of the content item from the second source will terminate prior to completion of presentation of the content item;
notifying the first source to resume streaming the content item;
resuming streaming of the content item from the first source; and
terminating streaming of the content item from the second source.

14. The method of claim 13, further comprising:
notifying the first source of a timestamp of the content item at which to resume streaming the content item from the first source.

15. The method of claim 9, wherein the presentation device comprises a media appliance.

16. A device for streaming content, comprising:
a processor; and
a communication interface;
wherein the processor and the communication interface are configured to:
stream a content item from a first source;
present the content item during the streaming;
identify a second source of the content item;
initiate streaming of the content item from the second source;
transmit, to the first source, a notification indicating that the presentation device is to stream the content item from the second source;
after transmitting the notification, terminating streaming of the content item from the first source; and
after termination of the streaming of the content item from the first source, maintain control of a presentation of the content item during streaming of the content item from the alternative source, wherein to maintain control of the presentation, the processor and the wireless communication interface are configured to
receive, from the first source, a control input for controlling the presentation of the content item as the presentation device streams the content item from the second source; and
use the control input to control the presentation of the content item.

17. A system for streaming content, comprising:
a wireless device configured to access to a first version of a content item;
a presentation device configured to present content and access a second version of the content item from an alternative source different from the wireless device;

a network device configured to make a wireless communication connection with the wireless device and a wired connection with the presentation device;

first logic configured to transmit a notification that the presentation device is to stream the second version of the content item from the alternative source and to replace streaming of the first version of the content item from the wireless device to the presentation device with streaming of the second version of the content item from the alternative source; and second logic configured to control presentation of the content item on the presentation device with control inputs from the wireless device, wherein to control presentation of the content item on the presentation device with control inputs from the wireless device, the second logic is configured to:

after replacing streaming of the first version of the content item from the wireless device to the presentation device with streaming of the second version of the content item from the alternative source, maintain control of a presentation of the content item during streaming of the second version of the content item from the alternative source, wherein to maintain control of the presentation, the system is configured to:

receive, from the wireless device, a control input for controlling the presentation of the content item as the presentation device streams the second version of the content item from the alternative source; and use the control inputs to control the presentation of the content item.

18. The system of claim 17, wherein the wireless device is configured to store the first version of the content item.

19. The system of claim 17, further comprising:

a content repository configured to store the second version of the content item, wherein the content repository is accessible by the presentation device via the network device.

20. The system of claim 19, wherein one or more of the first logic and the second logic are provided by an operator of the content repository.

* * * * *